(12) United States Patent
Hashimoto

(10) Patent No.: US 6,965,549 B2
(45) Date of Patent: Nov. 15, 2005

(54) OPTICAL DISC APPARATUS

(75) Inventor: Chiaki Hashimoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 620 days.

(21) Appl. No.: 10/059,324

(22) Filed: Jan. 31, 2002

(65) Prior Publication Data
US 2002/0105879 A1 Aug. 8, 2002

(30) Foreign Application Priority Data
Feb. 5, 2001 (JP) .......................... P 2001-028133

(51) Int. Cl.⁷ .............................................. G11B 7/00
(52) U.S. Cl. .............................. 369/53.22; 369/53.37
(58) Field of Search ........................... 369/53.2, 47.1, 369/53.1, 53.12, 53.11, 53.23, 53.31, 53.37, 369/44.25, 44.26, 53.22

(56) References Cited

U.S. PATENT DOCUMENTS 5,115,419 A * 5/1992 Akiyama et al. ......... 369/30.95
5,473,589 A * 12/1995 Horie ...................... 369/53.37
5,587,982 A * 12/1996 Choi ....................... 369/53.11

FOREIGN PATENT DOCUMENTS

| JP | 4-93917 U | 8/1992 |
| JP | 8-14929 B2 | 2/1996 |
| JP | 2000-195066 A | 7/2000 |

* cited by examiner

Primary Examiner—Nabil Hindi
(74) Attorney, Agent, or Firm—Morgan, Lewis & Bockius LLP

(57) ABSTRACT

In an optical disc apparatus 1, when a supply of operation power to the main unit is started, an objective lens 4a is moved to a focusing position (a position where the focus is placed on a reflective recording layer of an optical disc 10) which is determined in the design level. If the quantity of reflected light at this time is equal to or larger than a threshold SH, it is judged that the optical disc 10 is set in the main unit. Therefore, a time period required for detecting whether the optical disc 10 is set in the main unit or not can be shortened.

3 Claims, 4 Drawing Sheets

OPTICAL DISC APPARATUS

BACKGROUND OF THE INVENTION

Technical Field

The present invention relates to an optical disc apparatus which reads data recorded on an optical disc such as a CD, an LD, a DVD, or MD and writes data thereto.

Conventionally, there is an optical disc apparatus which reads (reproduces) data recorded on an optical disc such as a CD (Compact disc), an LD (Laser Disc), a DVD (Digital Versatile Disc), or an MD (Mini Disc), and which writes (records) data to such an optical disc.

An optical disc apparatus is provided with a pickup head which illuminates an optical disc with a light beam to detect reflected light from the optical disc. In an optical disc, a plurality of tracks are formed concentrically or spirally on a recording face. Data are recorded in the tracks. A mirror portion is formed between adjacent tracks. The pickup head comprises: an objective lens which focuses the light beam on a track of the optical disc; a mechanism which vertically moves the objective lens with respect to the optical disc (hereinafter, such a mechanism is referred to as a focusing mechanism); and another mechanism which moves the objective lens in a radial direction of the optical disc (hereinafter, such a mechanism is referred to as a tracking mechanism).

In a usual optical disc apparatus, when a supply of operation power to the main unit of the apparatus is started, it is detected whether an optical disc is set in the main unit or not. With respect to the detection of an optical disc, various methods using such an pickup head have been proposed (Japanese Patent Laid-Open No. 2000-195066, Japanese Patent Publication No. 14929/1996, and Japanese Utility Model Laid-Open No. 93917/1992).

[Problems to be Solved]

In the conventional detection of an optical disc, a method is employed in which the waveform of the quantity of reflected light is obtained while vertically moving an objective lens, and, if the obtained waveform is a waveform corresponding to the shape of a recording surface of an optical disc, i.e., a so-called S-curve waveform, it is judged that an optical disc is set. In a recording surface of an optical disc, the surface portion is configured as a transparent layer, and a reflective recording layer is formed below the transparent layer. The tracks for recording data are formed in the reflective recording layer.

As described above, in a conventional apparatus, it is detected whether an optical disc is set or not, on the basis of a change of the quantity of reflected light which is obtained while vertically moving an objective lens. This produces a problem in that the detection requires a long time period.

It is an object of the invention to provide an optical disc apparatus in which a time period required for detecting whether an optical disc is set in the main unit of the apparatus or not can be shortened.

[Means for Solving the Problems]

In order to solve the problem, the optical disc apparatus of the invention is configured in the following manner.

(1) The optical disc apparatus comprises:

a pickup head which illuminates an optical disc set in a main unit with a light beam via a lens, and which detects a quantity of reflected light from the optical disc;

a focusing section which vertically moves the lens of the pickup head with respect to the optical disc; and a controlling section which, when a supply of operation power is started, instructs the focusing section to move to a preset position that is previously determined with respect to the lens, which instructs the pickup head to emit the light beam, and which judges whether an optical disc is set in the main unit or not, on the basis of the quantity of reflected light detected by the pickup head.

In the above configuration, when the supply of operation power to the main unit of the apparatus is started, the lens of the pickup head is moved to a preset position that is previously determined with respect to the lens. It is then judged whether an optical disc is set or not, on the basis of the quantity of reflected light which is obtained at this time.

A vertical position of the lens where the focus is placed on a reflective recording layer of an optical disc set in the main unit is determined in the design level. In practice, the position which is determined in the design level is slightly varied under the influence of the working accuracy of the optical disc, the condition of setting the optical disc in the main unit, and the like. The focusing section absorbs the variation and to place the focus on the reflective recording layer of the optical disc.

In the case where an optical disc is set in the main unit, when the lens is moved to the position which is determined in the design level, a certain quantity of reflected light is obtained. When an appropriate threshold level is set in the quantity of reflected light, therefore, it is possible to detect whether an optical disc is set in the main unit or not.

Unlike the conventional art, a change of the quantity of reflected light when a lens is vertically moved is not detected, and it is detected whether an optical disc is set or not, on the basis of the quantity of reflected light obtained when the lens is placed in the position which is determined in the design level, and at which the focus is placed on a reflective recording layer. Therefore, the time period required for the detection can be shortened.

(2) The optical disc apparatus comprises:

a pickup head which illuminates an optical disc set in a main unit with a light beam via a lens, and which detects a quantity of reflected light from the optical disc;

a focusing section which vertically moves the lens of the pickup head with respect to the optical disc;

a tracking section which moves the lens of the pickup head in a radial direction of the optical disc; and a controlling section which, when a supply of operation power is started, instructs the focusing section and the tracking section to move to a preset position that is previously determined with respect to the lens, which instructs the pickup head to emit the light beam, and which judges whether an optical disc is set in the main unit or not, on the basis of the quantity of reflected light detected by the pickup head.

In the above configuration, when the supply of operation power to the main unit of the apparatus is started, the lens is moved also in a radial direction of the optical disc, in addition to the operation of (1) above.

In an optical disc, usually, a TOC (TITLE OF CONTENT) is recorded in an innermost circumferential portion. When data recorded on the optical disc are to be read out, information recorded in the TOC area must be first read out. The TOC is information indicating positions of the optical disc where data are recorded, and the kinds of the data.

In the case where an optical disc is set in the main unit, when the lens is previously moved to the TOC area, therefore, data recorded in the TOC area can be immediately read out, and hence the subsequent operation can be promptly performed.

(3) The apparatus further comprises a displaying section which, if the controlling section judges that an optical disc is not set in the main unit, displays a message indicating that an optical disc is not set.

In the above configuration, the user can be informed that an optical disc is not set in the main unit, and hence it is possible to request the user to take a prompt action. For example, an operation of setting of an optical disc into the main unit can be quickly performed.

(4) If the controlling section judges that an optical disc is not set in the main unit, the main unit transfers to a power save mode in which power consumption is suppressed.

In the above configuration, the power consumption of the main unit can be suppressed, and the apparatus is economical.

BRIEF DESCRIPTION OF THE DRAWINGS

FIG. 1 is a diagram showing the configuration of main portions of an optical disc apparatus which is an embodiment of the invention.

FIG. 2 is a view showing a pickup head.

FIG. 3 is a flowchart showing the operation of the optical disc apparatus of the embodiment of the invention.

FIG. 4 is a view illustrating a method of judging whether an optical disc is set in the main unit of the optical disc apparatus of the embodiment of the invention or not.

FIG. 5 is a flowchart showing the operation of an optical disc apparatus of another embodiment of the invention.

DETAILED DESCRIPTION OF THE PREFERRED EMBODIMENTS

[Mode for Carrying Out the Invention]

Hereinafter, an optical disc apparatus of an embodiment of the invention will be described.

Figure 1:
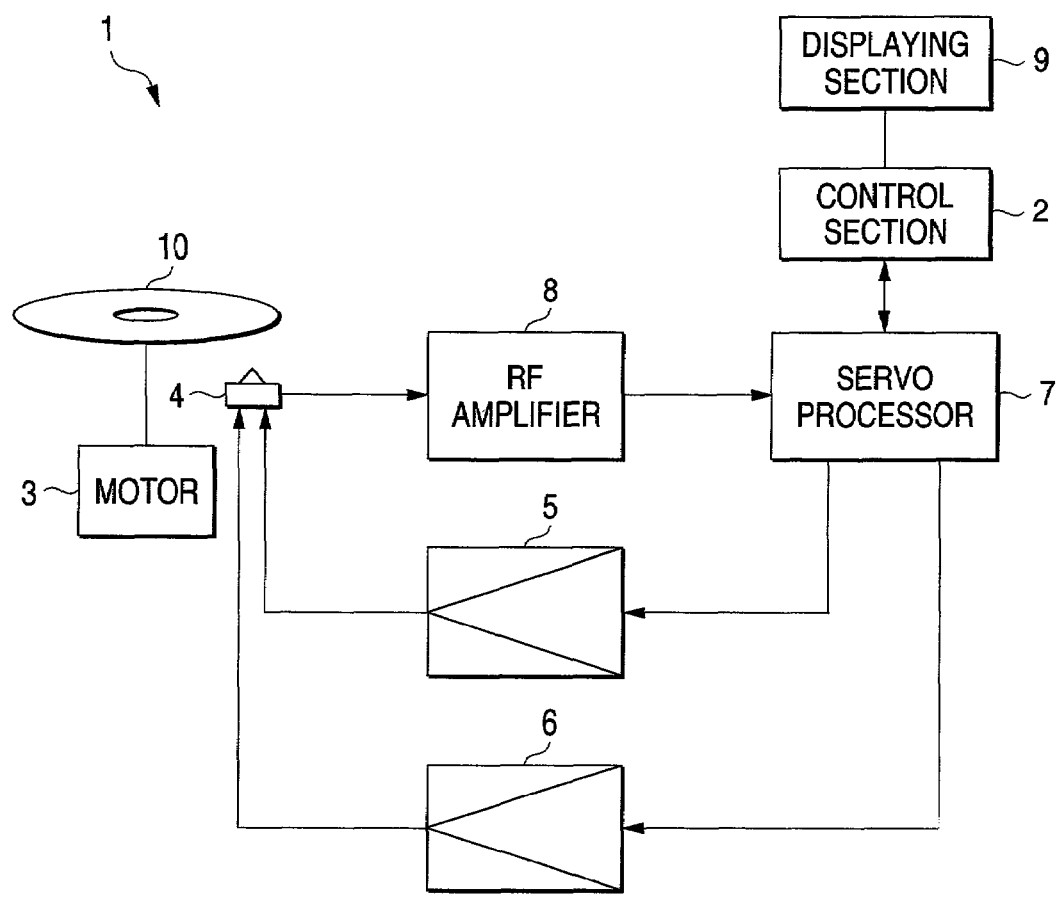
[FIG. 1]

FIG. 1 is a block diagram showing the configuration of main portions of an optical disc apparatus which is an embodiment of the invention. The optical disc apparatus 1 of the embodiment reads (reproduces) data recorded on an optical disc such as a CD (Compact disc), an LD (Laser Disc), a DVD (Digital Versatile Disc), or an MD (Mini Disc), and writes (records) data to such an optical disc.

The reference numeral 2 denotes a control section which controls the operation of the main unit, and 3 denotes a spindle motor which rotates the optical disc 10 set in the main unit. The reference numeral 4 denotes a pickup head which illuminates the optical disc 10 with a light beam, and which detects a reflected light from the optical disc 10. The pickup head 4 has a light projecting section (not shown), a four-split photodiode (not shown), and an objective lens 4a.

In a recording surface of the optical disc 10, the surface portion is configured as a transparent layer, and a reflective recording layer is formed below the transparent layer. Concentrical or spiral tracks for recording data are formed in the reflective recording layer.

Figure 2:
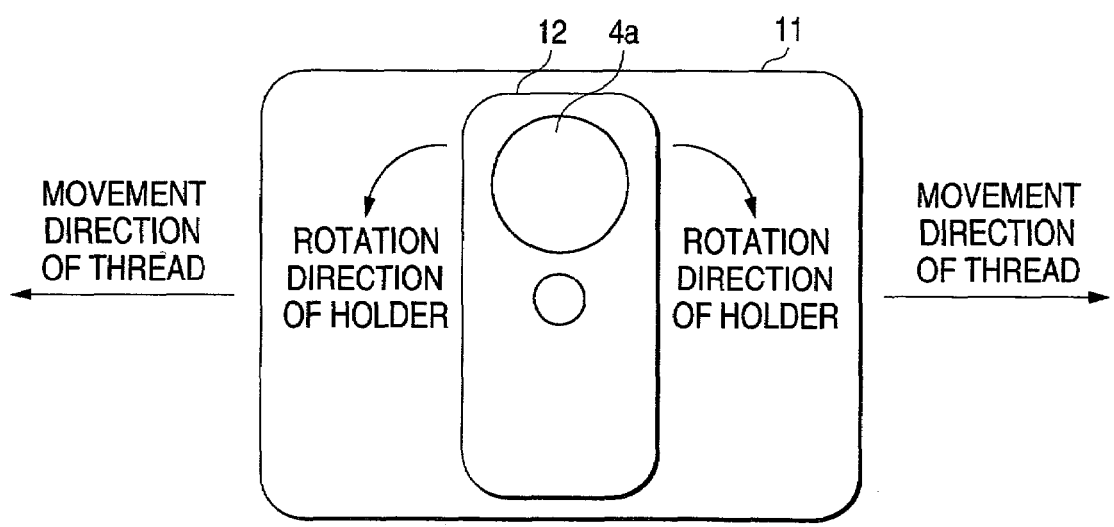
[FIG. 2]

As shown in FIG. 2, the pickup head 4 is placed on a thread 11. The thread 11 is configured so as to be movable in a radial direction (either of the directions indicated by arrows in FIG. 2) of the optical disc 10 by a thread motor which is not shown. The objective lens 4a of the pickup head 4 is attached to a holder 12. The holder 12 is rotatably attached to a rotation shaft disposed in a position which approximately coincides with the center of the thread 11. The rotation direction of the holder 12 is indicated by arrows in FIG. 2. The holder 12 is rotated by a tracking actuator which is not shown. When the holder 12 is rotated, the objective lens 4a is moved in a radial direction of the optical disc 10.

The holder 12 is configured so as to be movable also in the direction of the rotation shaft of the spindle motor 3 which rotates the optical disc 10. Namely, the objective lens 4a is configured so as to be movable in the vertical direction with respect to the optical disc 10 (the direction perpendicular to the sheet of FIG. 2). The objective lens 4a is vertically moved by a focus actuator which is not shown.

The reference numeral 5 denotes a tracking driver which supplies a driving signal to the tracking actuator to cause the holder 12 to be rotated with respect to the thread 11. In accordance with the rotation of the holder 12, the optical lens 4a is moved in a radial direction of the optical disc 10. The reference numeral 6 denotes a focusing driver which supplies a driving signal to the focus actuator to vertically move the holder 12 with respect to the optical disc 10. The reference numeral 7 denotes a servo processor which supplies a servo signal to the tracking driver 5 and the focusing driver 6, 8 denotes an RF amplifier which amplifies an output of the split photodiode of the pickup head 4, and 9 denotes a displaying section which displays the state of the apparatus main unit, and the like.

On the basis of the signal (the output of the split photodiode) supplied from the pickup head 4, the RF amplifier 8 produces a tracking error signal TE, a midpoint error signal CE, a focus error signal FE, etc. The tracking error signal TE, the midpoint error signal CE, and the focus error signal FE which are produced by the amplifier are supplied to the servo processor 7.

In a reproduction process the RF amplifier 8 produces a reproduction signal based on the output of the split photodiode. The reproduction signal is output from an output section which is not shown. In a record process, the control section 2 controls the light projecting section of the pickup head 4 to write data onto the optical disc 10. The description of details of operations in the reproduction and record processes is omitted.

The tracking error signal TE is a signal indicative of the degree of deviation between the center of a track formed in the recording surface of the optical disc 10 and the illumination position of the light beam. The illumination position of the light beam is opposed to the center of the objective lens 4a.

The midpoint error signal CE is a signal indicative of the degree of deviation between the split photodiode and the center of the objective lens 4a, i.e., the degree of rotation of the holder 12 with respect to the thread 11. When the state of the holder 12 with respect to the thread 11 is as shown in FIG. 2, the degree of deviation between the split photodiode and the center of the objective lens 4a is zero.

The focus error signal FE is a signal indicative of the degree of deviation between the reflective recording layer (the layer in which the tracks are formed) of the optical disc 10 and the focal position.

On the basis of the signals, the servo processor 7 controls the positions of the thread 11 and the holder 12, i.e., the position of the objective lens 4a.

Specifically, the servo processor 7 supplies the tracking servo signal which is produced on the basis of the input tracking error signal TE, to the tracking driver 5. On the basis of the input tracking servo signal, the tracking driver 5 drives the tracking actuator so that the center of the objective lens 4a, i.e., the illumination position of the light beam is placed on the center of a track. The tracking servo signal is a signal for making the illumination position of the light beam coincident with the center of a track.

A focus servo signal which is produced on the basis of the input focus error signal FE is supplied to the focusing driver 6. The focusing driver 6 drives the focus actuator on the basis of the input focus servo signal to place the focus on the reflective recording layer of the optical disc 10. The focus servo signal is a signal for placing the focus on the reflective recording layer of the optical disc 10.

In some cases, the servo processor 7 supplies a midpoint servo signal which is produced on the basis of the input midpoint error signal CE, to the tracking driver 5. On the basis of the input midpoint servo signal, the tracking driver 5 drives the actuator so that the center of the objective lens 4a is moved to the center of the split photodiode. The midpoint servo signal is a signal for setting the state where the holder 12 is in the reference position with respect to the thread 11.

Hereinafter, the operation in the case where the optical disc apparatus 1 of the embodiment is powered on will be described.

Figure 3:
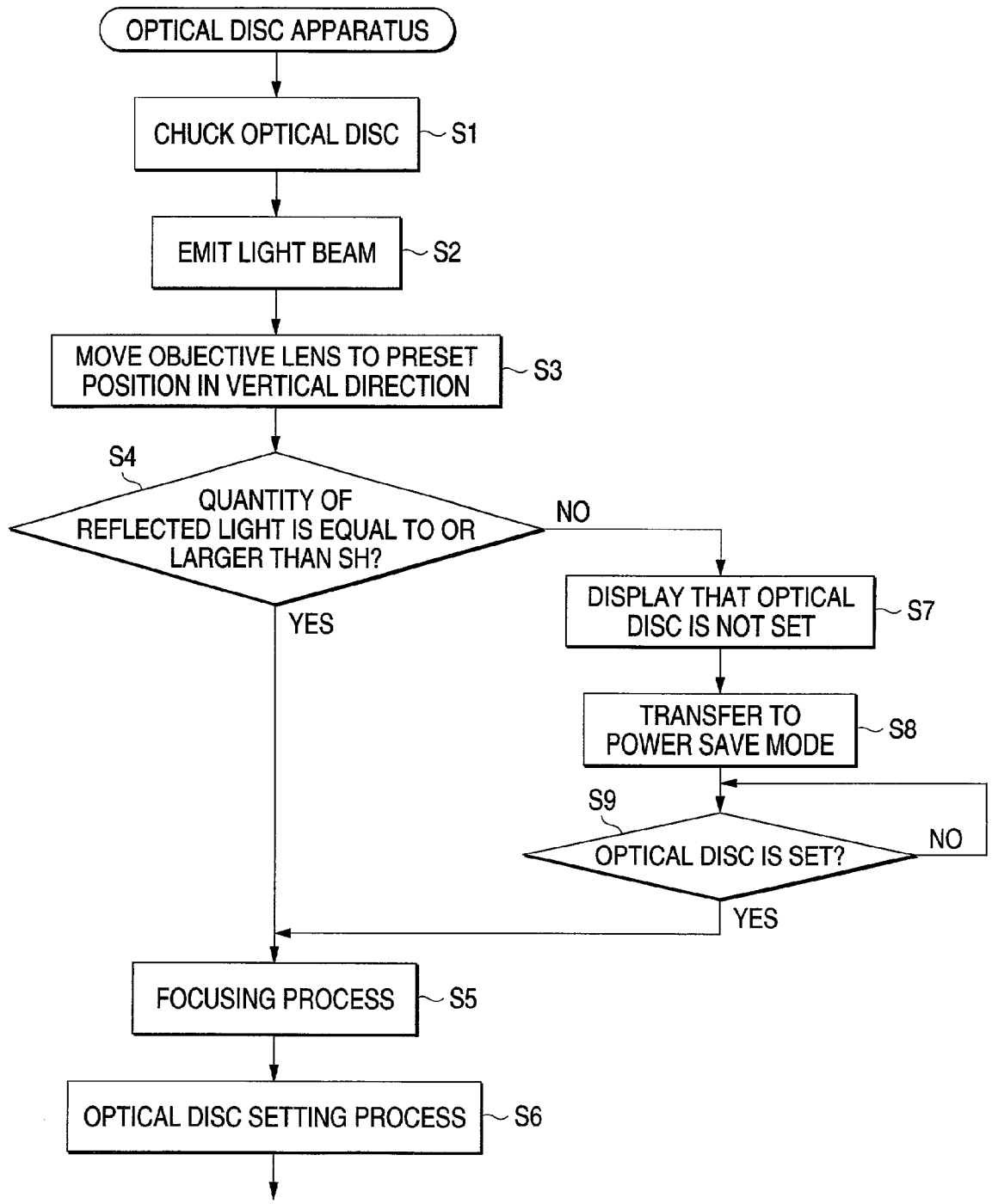
[FIG. 3]

FIG. 3 is a flowchart showing the operation in the case where the optical disc apparatus of the embodiment is powered on. When a power source switch of the main unit is turned on and a supply of operation power is started, the optical disc apparatus 1 starts the process shown in FIG. 3. First, a disk chucking operation for holding the optical disc 10 to the rotation shaft of the spindle motor 3 is conducted (s1). The process of s1 is any time conducted irrespective of whether the optical disc 10 is set in the main unit or not. This does not produce a particular problem in operation.

Thereafter, the spindle motor 3 is rotated, and the light projecting section of the pickup head 4 emits a light beam (s2). The servo processor 7 supplies the focus servo signal of a preset level to the focusing driver 6. As a result, the focusing driver 6 drives the focus actuator so that the objective lens 4a is moved to a preset position which is previously set in the vertical direction of the optical disc 10 (s3).

The preset position means a position where, in the design level, a light beam emitted from the light projecting section of the pickup head 4 is focused on the reflective recording layer of the optical disc 10 which is set in the main unit. In practice, the position is slightly shifted under the influence of the condition of setting the optical disc 10 in the main unit, the working accuracy of the optical disc 19, and the like.

Figure 4:
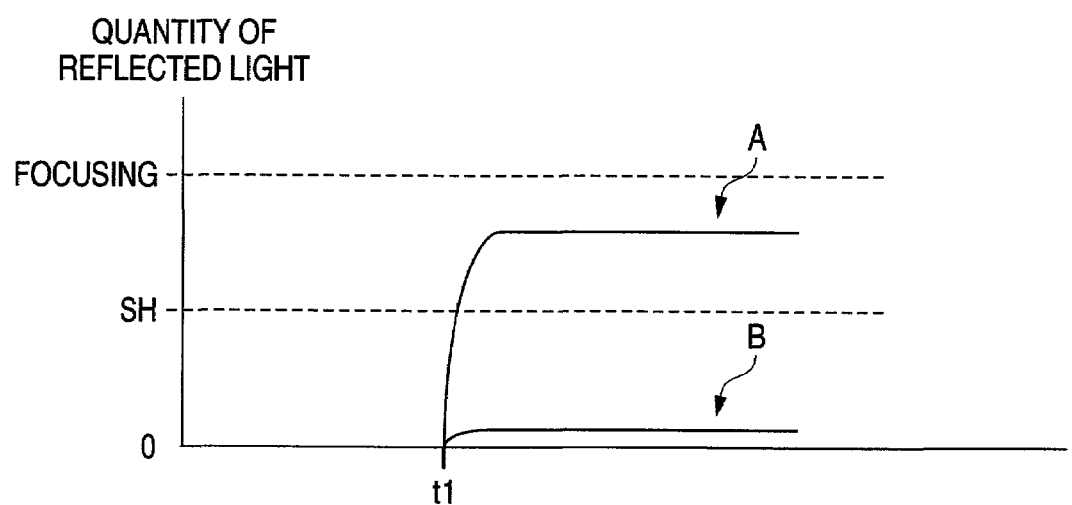
[FIG. 4]

Then, it is judged whether the output of the pickup head 4 (the split photodiode), i.e., the quantity of reflected light of the light beam emitted from the light projecting section is equal to or larger than a preset threshold SH or not (s4). When the optical disc 10 is set in the main unit, a certain quantity of reflected light is detected as indicated by A in FIG. 4. By contrast, when the optical disc 10 is not set, the quantity of reflected light is scarcely detected as indicated by B in FIG. 4. The focusing shown in FIG. 4 indicates the level of the quantity of reflected light which is obtained when the focal point of the light beam emitted from the light projecting section of the pickup head 4 is placed on the reflective recording layer of the optical disc 10 set in the main unit.

When the threshold SH is set to be smaller than the level of the focusing and larger than that of the quantity of reflected light which is obtained when the optical disc 10 is not set, therefore, it is possible to judge whether the optical disc 10 is set in the main unit or not, as a result of the judgement of s4.

If it is judged in s4 that the quantity of reflected light is equal to or larger than the threshold SH, i.e., it is judged that the optical disc 10 is set in the main unit, a focusing process of focusing on the optical disc 10 is conducted (s5), and a disc setting process is then conducted (s6). The focusing process means a process in which the objective lens 4a is vertically moved to place the focus on the surface of a track of the optical disc 10. For example, the disc setting process is a start of reproduction of the optical disc 10 which is set.

By contrast, if it is judged in s4 that the quantity of reflected light is smaller than the threshold SH, i.e., it is judged that the optical disc 10 is not set in the main unit, an indication that an optical disc is not set is displayed (s7). For example, a message "AN OPTICAL DISC IS NOT SET." is displayed on the displaying section 9.

Next, the main unit transfers to a power save mode (s8), and waits for the optical disc 10 to be set (s9). Thereafter, the control proceeds to the above-mentioned process of s5. The power save mode is a mode in which power consumption of the main unit is suppressed, and the power supply to the tracking driver 5, the focusing driver 6, and the like is suspended.

As described above, in the optical disc apparatus 1 of the embodiment, when the operation power is supplied to the main unit, the objective lens 4a is moved to the preset vertical position that is previously determined, and it is judged whether an optical disc is set in the main unit or not, based on the quantity of reflected light which is detected by the pickup head 4 at this time. Therefore, the judgement requires a very short time period.

If the optical disc 10 is not set, a message indicating this is displayed on the displaying section 9. Therefore, the user can be informed that the optical disc 10 is not set.

If the optical disc 10 is not set, the main unit transfers to the power save mode. When the optical disc 10 is not set, therefore, the power consumption can be suppressed, and hence the apparatus is economical.

Figure 5:
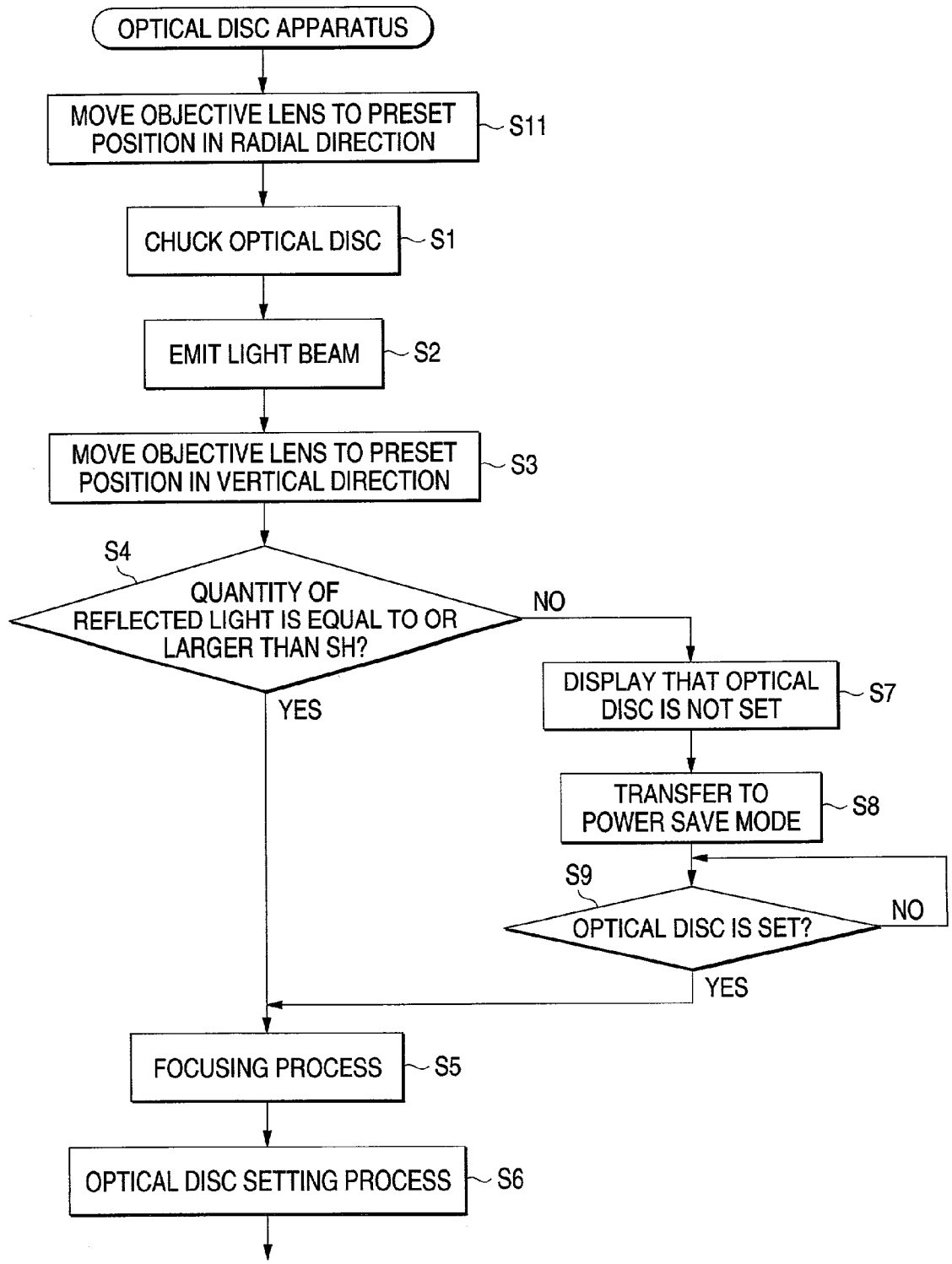
[FIG. 5]

Alternatively, as shown in FIG. 5, the above-mentioned processes subsequent to s1 may be conducted after the objective lens 4a is moved to a preset position that is previously determined in a radial direction of the optical disc 10.

In s11, the thread 11 is moved or the holder 12 is rotated with respect to the thread 11, or both the operations are conducted to move the objective lens 4a to a preset radial position. Preferably, the preset radial position is an innermost circumference of an optical disc which is determined in the design level, because of the following reason. A recording area for recording a TOC (TITLE OF CONTENT) is formed in an innermost circumferential portion of the optical disc 10. When data recorded on the optical disc are to be read out, information recorded in the TOC area must be first read out. The TOC is information indicating positions of the optical disc where data are recorded, and the kinds of the data.

If it is judged in s4 that the optical disc 10 is set in the main unit, therefore, a process of reading or writing data can be promptly performed on the optical disc 10.

[Effects of the Invention]

As described above, according to the invention, a time period required for, when a supply of operation power is started, detecting whether an optical disc is set in the main unit of the apparatus or not can be shortened.

If an optical disc is not set, a message indicating this is displayed. Therefore, the user can take a prompt action.

If an optical disc is not set, the main unit transfers to the power save mode. Therefore, the power consumption of the main unit can be suppressed, and hence the apparatus is economical.

What is claimed is:

1. An optical disc apparatus comprising:
   a pickup head which illuminates an optical disc set in a main unit with a light beam via a lens, and which detects a quantity of reflected light from said optical disc;
   a focusing section which vertically moves said lens of said pickup head with respect to said optical disc;
   a tracking section which moves said lens of said pickup head in a radial direction of said optical disc;
   a controlling section which, when a supply of operation power is started, instructs said focusing section and said tracking section to move to a preset position that is previously determined with respect to said lens, which instructs said pickup head to emit said light beam, and which judges whether an optical disc is set in said main unit or not, on the basis of said quantity of reflected light detected by said pickup head; and
   a displaying section which, if said controlling section judges that an optical disc is not set in said main unit, displays a message indicating that an optical disc is not set, wherein
   said lens preset position on which said controlling section instructs said tracking section is a position where said light beam impinges on a vicinity of an innermost circumference of said optical disc, and
   if said controlling section judges that an optical disc is not set in said main unit, said controlling section transferring to a power save mode in which power consumption of said main unit is suppressed.

2. An optical disc apparatus comprising:
   a pickup head which illuminates an optical disc set in a main unit with a light beam via a lens, and which detects a quantity of reflected light from said optical disc;
   a focusing section which vertically moves said lens of said pickup head with respect to said optical disc; and
   a controlling section which, when a supply of operation power is started, instructs said focusing section to move to a preset position that is previously determined with respect to said lens, which instructs said pickup head to emit said light beam, and which judges whether an optical disc is set in said main unit or not, on the basis of said quantity of reflected light detected by said pickup head,
   wherein if said controlling section judges that an optical disc is not set in said main unit, said controlling section transfers to a power save mode in which power consumption of said main unit is suppressed.

3. An optical disc apparatus comprising:
   a pickup head which illuminates an optical disc set in a main unit with a light beam via a lens, and which detects a quantity of reflected light from said optical disc;
   a focusing section which vertically moves said lens of said pickup head with respect to said optical disc;
   a tracking section which moves said lens of said pickup head in a radial direction of said optical disc; and
   a controlling section which, when a supply of operation power is started, instructs said focusing section and said tracking section to move to a preset position that is previously determined with respect to said lens, which instructs said pickup head to emit said light beam, and which judges whether an optical disc is set in said main unit or not, on the basis of said quantity of reflected light detected by said pickup head,
   wherein if said controlling section judges that an optical disc is not set in said main unit, said controlling section transfers to a power save mode in which power consumption of said main unit is suppressed.

* * * * *